United States Patent
Kalaichelvan et al.

(10) Patent No.: US 11,477,522 B2
(45) Date of Patent: Oct. 18, 2022

(54) TRICK PLAY AND TRICK RATE SUPPORT FOR HLS

(71) Applicant: ARRIS Enterprises LLC, Suwanee, GA (US)

(72) Inventors: Kaliraj Kalaichelvan, San Diego, CA (US); Bill Franks, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 17 days.

(21) Appl. No.: 17/119,386

(22) Filed: Dec. 11, 2020

(65) Prior Publication Data

US 2021/0185393 A1 Jun. 17, 2021

Related U.S. Application Data

(60) Provisional application No. 63/030,771, filed on May 27, 2020, provisional application No. 62/946,936, filed on Dec. 11, 2019.

(51) Int. Cl.
*H04N 7/173* (2011.01)
*H04N 21/4402* (2011.01)
*H04N 21/442* (2011.01)
*H04N 21/437* (2011.01)

(52) U.S. Cl.
CPC ..... *H04N 21/44029* (2013.01); *H04N 21/437* (2013.01); *H04N 21/44209* (2013.01)

(58) Field of Classification Search
CPC ........... H04N 21/44029; H04N 21/437; H04N 21/44209; H04N 21/4305; H04N 21/4825; H04N 21/8456
See application file for complete search history.

(56) References Cited

U.S. PATENT DOCUMENTS

| | | | |
|---|---|---|---|
| 7,263,497 B1* | 8/2007 | Wiser ................. | G06Q 30/0633 705/26.8 |
| 7,483,958 B1* | 1/2009 | Elabbady ........... | H04N 7/17318 709/219 |
| 8,243,924 B2* | 8/2012 | Chen ................... | H04N 21/238 380/217 |
| 2004/0162787 A1* | 8/2004 | Madison ................. | G06F 21/10 705/64 |

(Continued)

*Primary Examiner* — Michael B. Pierorazio
(74) *Attorney, Agent, or Firm* — Chernoff, Vilhauer, McClung & Stenzel, LLP

(57) ABSTRACT

A method and system for rendering a HTTP Live Streaming video stream on a display includes a player receiving a master manifest from a network device in response to selecting a video channel. The player also receives a plurality of variant manifests referenced by the master manifest from the network device, where each of the variant manifests references video files each of which having a different bit rate for the same video stream. The player simultaneously maintains the variant manifests in the player. The player determines an effective start time of the video stream based upon the selecting video channel where the effective start time is a time later than an earliest time referenced in the plurality of variant manifests. The player enables reverse of the video stream based upon one of the variant manifests to as early as the effective start time and not enabling reverse of the video stream based upon one of the variant manifests to a time earlier than the effective start time.

15 Claims, 15 Drawing Sheets

(56) References Cited

U.S. PATENT DOCUMENTS

| | | | | |
|---|---|---|---|---|
| 2005/0097313 A1* | 5/2005 | Bolosky | ............... | H04L 9/0656 713/150 |
| 2005/0120132 A1* | 6/2005 | Hutter | ................... | H04L 69/329 709/219 |
| 2008/0170630 A1* | 7/2008 | Falik | ................ | H04N 21/44004 375/E7.193 |
| 2008/0294786 A1* | 11/2008 | Tinker | ................ | H04L 29/1249 709/229 |
| 2009/0003600 A1* | 1/2009 | Chen | ................... | H04N 7/1675 380/217 |
| 2009/0327698 A1* | 12/2009 | Baker | .................. | H04N 21/234 713/153 |
| 2010/0235472 A1* | 9/2010 | Sood | ................... | H04L 65/4092 709/224 |
| 2011/0099594 A1* | 4/2011 | Chen | ................... | H04L 65/4084 725/105 |
| 2011/0196982 A1* | 8/2011 | Chen | ................... | H04L 65/4084 709/231 |
| 2011/0246621 A1* | 10/2011 | May, Jr. | ............. | H04N 21/8543 709/219 |
| 2012/0110620 A1* | 5/2012 | Kilar | ................... | H04N 21/812 725/34 |
| 2012/0311721 A1* | 12/2012 | Chen | ................... | H04N 21/238 709/217 |
| 2014/0281010 A1* | 9/2014 | Panje | ................... | H04L 65/60 709/231 |
| 2015/0067722 A1* | 3/2015 | Bjordammen | ....... | H04N 21/812 725/32 |

* cited by examiner

MASTER PLAYLIST

```
#EXTM3U
#EXT-X-STREAM-INF:BANDWIDTH=150000,RESOLUTION=416x234,CODECS="avc1.42e00a,mp4a.40.2"
http://example.com/low/index.m3u8
#EXT-X-STREAM-INF:BANDWIDTH=240000,RESOLUTION=416x234,CODECS="avc1.42e00a,mp4a.40.2"
http://example.com/lo_mid/index.m3u8
#EXT-X-STREAM-INF:BANDWIDTH=440000,RESOLUTION=416x234,CODECS="avc1.42e00a,mp4a.40.2"
http://example.com/hi_mid/index.m3u8
#EXT-X-STREAM-INF:BANDWIDTH=640000,RESOLUTION=640x360,CODECS="avc1.42e00a,mp4a.40.2"
http://example.com/high/index.m3u8
#EXT-X-STREAM-INF:BANDWIDTH=64000,CODECS="mp4a.40.5"
http://example.com/audio/index.m3u8
```

FIG. 3

VOD PLAYLIST

```
#EXTM3U
#EXT-X-PLAYLIST-TYPE:VOD
#EXT-X-TARGETDURATION:10
#EXT-X-VERSION:4
#EXT-X-MEDIA-SEQUENCE:0
#EXTINF:10.0,
http://example.com/movie1/fileSequenceA.ts
#EXTINF:10.0,
http://example.com/movie1/fileSequenceB.ts
#EXTINF:10.0,
http://example.com/movie1/fileSequenceC.ts
#EXTINF:9.0,
http://example.com/movie1/fileSequenceD.ts
#EXT-X-ENDLIST
```

FIG. 4

EVENT PLAYLIST

```
#EXTM3U
#EXT-X-PLAYLIST-TYPE:EVENT
#EXT-X-TARGETDURATION:10
#EXT-X-VERSION:4
#EXT-X-MEDIA-SEQUENCE:0
#EXTINF:10.00,
fileSequence0.ts
#EXTINF:10.0,
fileSequence1.ts
#EXTINF:10.0,
fileSequence2.ts
#EXTINF:10.0,
fileSequence3.ts
#EXTINF:10.0,
fileSequence4.ts
```

FIG. 5

EVENT PLAYLIST
UPDATED

```
#EXTM3U
#EXT-X-PLAYLIST-TYPE:EVENT
#EXT-X-TARGETDURATION:10
#EXT-X-VERSION:4
#EXT-X-MEDIA-SEQUENCE:0
#EXTINF:10.0,
fileSequence0.ts
#EXTINF:10.0,
fileSequence1.ts
#EXTINF:10.0,
fileSequence2.ts
#EXTINF:10.0,
fileSequence3.ts
#EXTINF:10.0,
fileSequence4.ts // List of files between 4 and 120 go here.

EXTINF:10.0,
fileSequence120.ts
#EXTINF:10.0,
fileSequence121.ts
#EXT-X-ENDLIST
```

FIG. 6

SLIDING WINDOW
PLAYLIST

```
#EXTM3U
#EXT-X-TARGETDURATION:10
#EXT-X-VERSION:4
#EXT-X-MEDIA-SEQUENCE:1
#EXTINF:10.0,
fileSequence1.ts
#EXTINF:10.0,
fileSequence2.ts
#EXTINF:10.0,
fileSequence3.ts
#EXTINF:10.0,
fileSequence4.ts
#EXTINF:10.0,
fileSequence5.ts
```

FIG. 7

SLIDING WINDOW
PLAYLIST UPDATED

```
#EXTM3U
#EXT-X-TARGETDURATION:10
#EXT-X-VERSION:4
#EXT-X-MEDIA-SEQUENCE:2
#EXTINF:10.0,
fileSequence2.ts
#EXTINF:10.0,
fileSequence3.ts
#EXTINF:10.00,
fileSequence4.ts
#EXTINF:10.00,
fileSequence5.ts
#EXTINF:10.0,
fileSequence6.ts
```

FIG. 8

SLIDING WINDOW
PLAYLIST UPDATED

```
#EXTM3U
#EXT-X-TARGETDURATION:10
#EXT-X-VERSION:4
#EXT-X-MEDIA-SEQUENCE:4
#EXTINF:10.00,
fileSequence4.ts
#EXTINF:10.00,
fileSequence5.ts
#EXTINF:10.0,
fileSequence6.ts,
#EXTINF:10.0,
fileSequence7.ts,
#EXTINF:10.0,
fileSequence8.ts,
#EXTINF:10.0,
fileSequence9.ts
```

FIG. 9

PLAYER

MASTER PLAYLIST
    LOW BITRATE VOD PLAYLIST
    MEDIUM BITRATE VOD PLAYLIST
    HIGH BITRATE VOD PLAYLIST
    AUDIO PLAYLIST

FIG. 12

PLAYER

MASTER PLAYLIST
    LOW BITRATE EVENT PLAYLIST + UPDATED
    MEDIUM BITRATE EVENT PLAYLIST + UPDATES
    HIGH BITRATE EVENT PLAYLIST + UPDATES
    AUDIO PLAYLIST

FIG. 13

PLAYER

MASTER PLAYLIST
    LOW BITRATE SLIDING WINDOW PLAYLIST + UPDATED
    MEDIUM BITRATE SLIDING WINDOW PLAYLIST + UPDATES
    HIGH BITRATE SLIDING WINDOW PLAYLIST + UPDATES
    AUDIO PLAYLIST

FIG. 14

PLAYER

PLAY
    REPOSITION
    FAST REVERSE (2X, 4X, 6X)
    FAST FORWARD (2X, 4X, 6X)
    PAUSE

FIG. 16

TRICK PLAY AND TRICK RATE SUPPORT FOR HLS

CROSS REFERENCE TO RELATED APPLICATIONS

This application claims the benefit of U.S. Provisional Patent Application Ser. No. 62/946,936 filed Dec. 11, 2019 and entitled "Trick Play and Trick Rate Support for HLS Live Sliding Window Playlists" and U.S. Provisional Patent Application Ser. No. 63/030,771 filed May 27, 2020 and entitled "TRICK PLAY AND TRICK RATE SUPPORT FOR HLS" The complete disclosure of the above application is hereby incorporated by reference for all purposes.

BACKGROUND

The subject matter of this application relates to HLS media streams.

Cable system operators and other network operators provide streaming media to a gateway device for distribution in a consumer's home. The gateway device offers a singular point to access different types of content, such as live content, on-demand content, online content, over-the-top content, and content stored on a local or a network based digital video recorder. The gateway enables a connection to home network devices. The connection may include, for example, connection to a WiFi router or a Multimedia over Coax Alliance (MoCA) connection that provide IP over in-home coaxial cabling.

Consumers prefer to use devices that are compliant with standard protocols to access streaming video from the gateway device, so that all the devices within the home are capable of receiving streaming video content provided from the same gateway device. HTTP Live Streaming (HLS) is an adaptive streaming communications protocol created by Apple to communicate with iOS, Apple TV devices, and Macs running OSX Snow Leopard or later. HLS is capable of distributing both live and on-demand files, and is the sole technology available for adaptively streaming to Apple devices.

BRIEF DESCRIPTION OF THE DRAWINGS

For a better understanding of the invention, and to show how the same may be carried into effect, reference will now be made, by way of example, to the accompanying drawings, in which:

FIG. 3 illustrates a HLS mater playlist.
FIG. 4 illustrates a HLS VOD playlist.
FIG. 5 illustrates an event playlist.
FIG. 6 illustrates an updated event playlist.
FIG. 7 illustrates a sliding window playlist.
FIG. 8 illustrates an updated sliding window playlist.
FIG. 9 illustrates a further updated sliding window playlist.
FIG. 12 illustrates a player with VOD playlists.
FIG. 13 illustrates a player with event playlists.
FIG. 14 illustrates a player with sliding window playlists.
FIG. 16 illustrates a HLS player.

DETAILED DESCRIPTION

Figure 1:
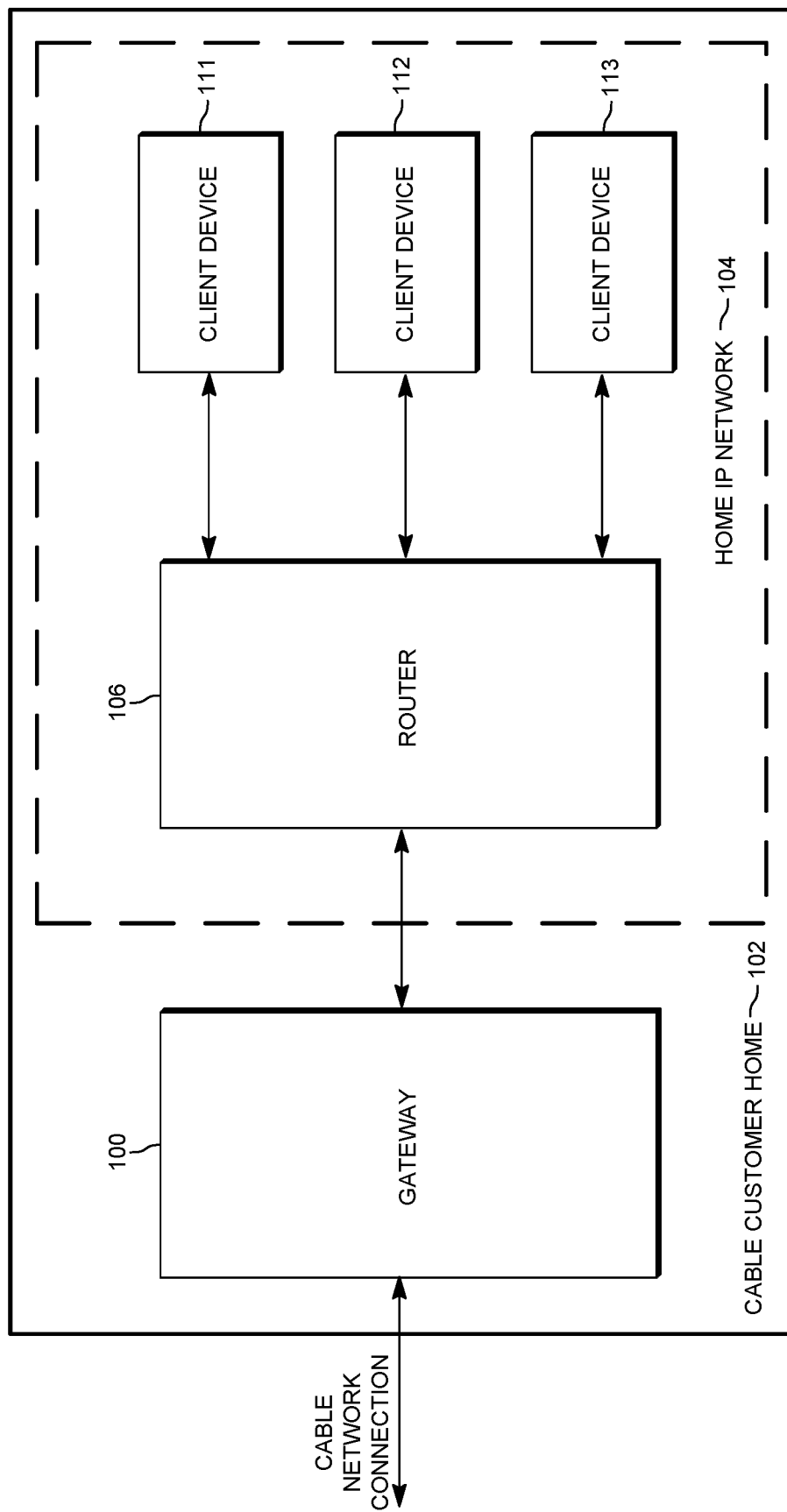
FIG. 1 illustrates an overview of a cable system.

Referring to FIG. 1, a cable system overview is illustrated with a cable network connection provided to a gateway 100 of a cable customer's home 102. The cable network connection provided to the gateway 100 may be from a cable system operator or other streaming content provider, such as a satellite system. The gateway 100 provides content to devices in a home network 104 in the consumer's home 102. The home network 104 may include a router 106 that receives IP content from the gateway 100 and distributes the content over a WiFi or a cable connection to client devices 111, 112, 113. The router 106 may be included as part of the gateway 100. In general, the cable network connection, or other types of Internet or network connection, provides streaming media content to client devices in any suitable manner. The streaming media content may be in the form of HTTP Live Streaming (HLS).

Figure 2:
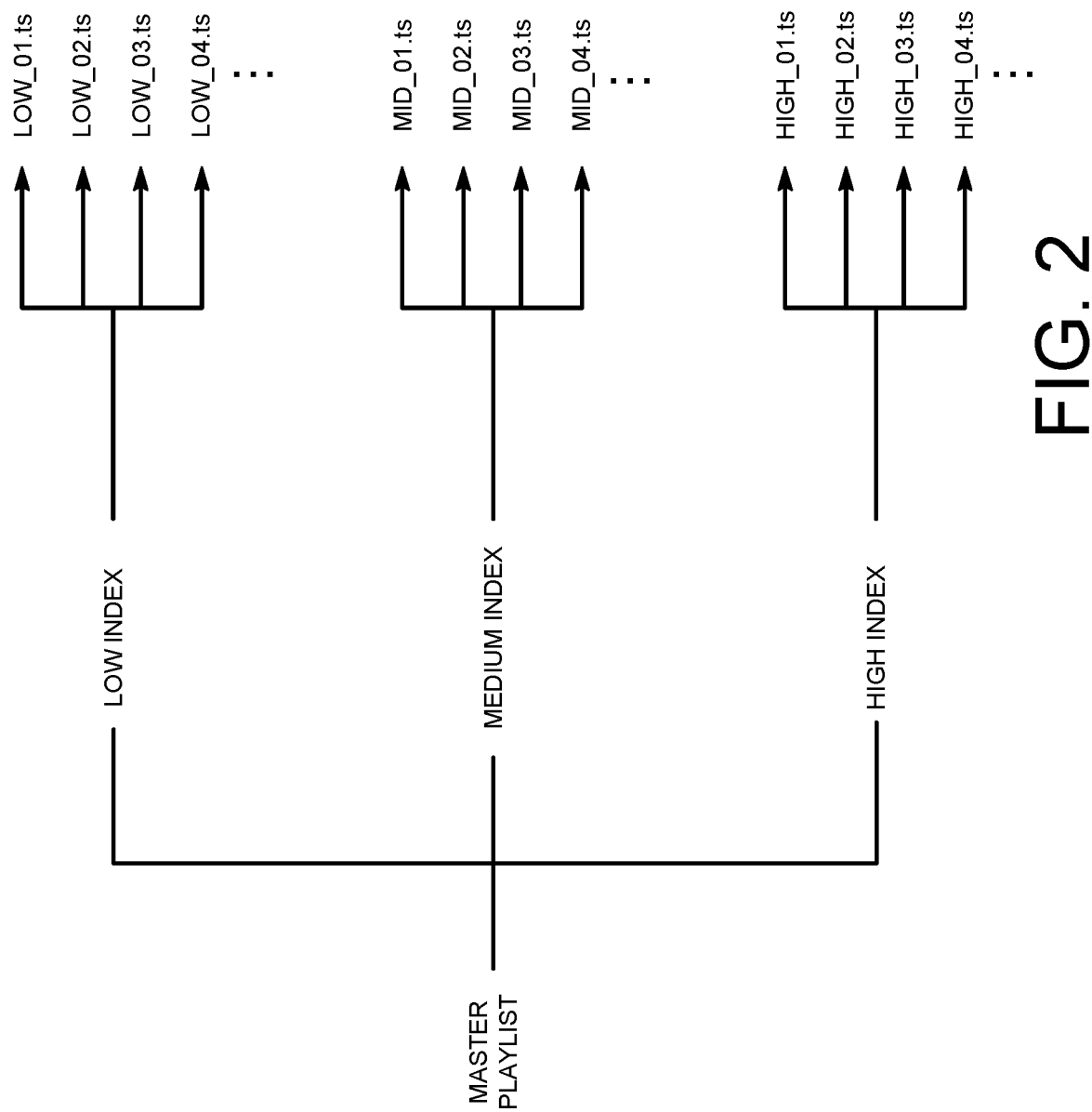
FIG. 2 illustrates HLS streaming video content.

Referring to FIG. 2, at a high level HLS enables adaptive streaming of video content, by creating multiple files for distribution to a media player, which adaptively changes media streams being obtained to optimize the playback experience. HLS is a HTTP-based technology so that no streaming server is required, so all the switching logic resides on the player. To distribute content to HLS players, the video content is encoded into multiple files at different data rates and divided into short chucks, each of which is typically between 5-10 seconds long. The chunks are loaded onto a HTTP server along with a text based manifest file with a .M3U8 extension that directs the player to additional manifest files for each of the encoded media streams. The short video content media files are generally referred to as "chunked" files.

The player monitors changing bandwidth conditions over time to the player. If the change in bandwidth conditions indicates that the stream should be changed to a different bit rate, the player checks the master manifest file for the location of additional streams having different bit rates. Using a stream specific manifest file for a selected different stream, the URL of the next chuck of video data is requested. In general, the switching between video streams by the player is seamless to the viewer.

A master playlist (e.g., manifest file) describes all of the available variants for the content. Each variant is a version of the stream at a particular bit rate and is contained in a separate variant playlist (e.g., manifest file). The client switches to the most appropriate variant based on the measured network bit rate to the player. The client's player is tuned to minimize playback stalling to give the viewer the best possible streaming experience. The master playlist isn't typically re-read. Once the player has read the master playlist, it assumes the set of variants isn't changing. The stream ends as soon as the client sees the EXT-X-ENDLIST tag on one of the individual variant playlists.

For example, the master playlist may include a set of three variant playlists. A low index playlist, having a relatively low bit rate, may reference a set of respective chunk files. A medium index playlist, having a medium bit rate, may reference a set of respective chunk files. A high index playlist, having a relatively high bit rate, may reference a set of respective chunk files.

Referring to FIG. 3, an exemplary master playlist that defines five different variants is illustrated. Exemplary tags used in the master playlist may include one or more of the following.

EXTM3U: Indicates that the playlist is an extended M3U file. This type of file is distinguished from a basic M3U file by changing the tag on the first line to EXTM3U. All HLS playlists start with this tag.

EXT-X-STREAM-INF: Indicates that the next URL in the playlist file identifies another playlist file. The EXT-X-STREAM-INF tag has the following parameters.

AVERAGE-BANDWIDTH: An integer that represents the average bit rate for the variant stream.

BANDWIDTH: An integer that is the upper bound of the overall bitrate for each media file, in bits per second. The upper bound value is calculated to include any container overhead that appears or will appear in the playlist.

FRAME-RATE: A floating-point value that describes the maximum frame rate in a variant stream.

HDCP-LEVEL: Indicates the type of encryption used. Valid values are TYPE-0 and NONE. Use TYPE-0 if the stream may not play unless the output is protected by HDCP.

RESOLUTION: The optional display size, in pixels, at which to display all of the video in the playlist. This parameter should be included for any stream that includes video.

VIDEO-RANGE: A string with valid values of SDR or PQ. If transfer characteristic codes 1, 16, or 18 aren't specified, then this parameter must be omitted.

CODECS: (Optional, but recommended) A quoted string containing a comma-separated list of formats, where each format specifies a media sample type that's present in a media segment in the playlist file. Valid format identifiers are those in the ISO file format name space defined by RFC 6381 [RFC6381].

Referring to FIG. 4, one of the types of video playlists include a video on demand (VOD) playlist. For VOD sessions, media files are available representing the entire duration of the presentation. The index file is static and contains a complete list of URLs to all media files created since the beginning of the presentation. This kind of session allows the client full access to the entire program.

Exemplary tags used in the VOD playlist may include one or more of the following.

EXTM3U: Indicates that the playlist is an extended M3U file. This type of file is distinguished from a basic M3U file by changing the tag on the first line to EXTM3U. All HLS playlists start with this tag.

EXT-X-PLAYLIST-TYPE: Provides mutability information that applies to the entire playlist file. This tag may contain a value of either EVENT or VOD. If the tag is present and has a value of EVENT, the server must not change or delete any part of the playlist file (although it may append lines to it). If the tag is present and has a value of VOD, the playlist file must not change.

EXT-X-TARGETDURATION: Specifies the maximum media-file duration.

EXT-X-VERSION: Indicates the compatibility version of the playlist file. The playlist media and its server must comply with all provisions of the most recent version of the IETF Internet-Draft of the HTTP Live Streaming specification that defines that protocol version.

EXT-X-MEDIA-SEQUENCE: Indicates the sequence number of the first URL that appears in a playlist file. Each media file URL in a playlist has a unique integer sequence number. The sequence number of a URL is higher by 1 than the sequence number of the URL that preceded it. The media sequence numbers have no relation to the names of the files.

EXTINF: A record marker that describes the media file identified by the URL that follows it. Each media file URL must be preceded by an EXTINF tag. This tag contains a duration attribute that's an integer or floating-point number in decimal positional notation that specifies the duration of the media segment in seconds. This value must be less than or equal to the target duration.

EXT-X-ENDLIST: Indicates that no more media files will be added to the playlist file.

The VOD playlist example in FIG. 4 uses full pathnames for the media file playlist entries. While this is allowed, using relative pathnames is preferable. Relative pathnames are more portable than absolute pathnames and are relative to the URL of the playlist file. Using full pathnames for the individual playlist entries often results in more text than using relative pathnames.

Referring to FIG. 5, an event playlist is specified by the EXT-X-PLAYLIST-TYPE tag with a value of EVENT. It doesn't initially have an EXT-X-ENDLIST tag, indicating that new media files will be added to the playlist as they become available.

Exemplary tags used in the EVENT playlist may include one or more of the following.

EXTM3U: Indicates that the playlist is an extended M3U file. This type of file is distinguished from a basic M3U file by changing the tag on the first line to EXTM3U. All HLS playlists start with this tag.

EXT-X-PLAYLIST-TYPE: Provides mutability information that applies to the entire playlist file. This tag may contain a value of either EVENT or VOD. If the tag is present and has a value of EVENT, the server must not change or delete any part of the playlist file (although it may append lines to it). If the tag is present and has a value of VOD, the playlist file must not change.

EXT-X-TARGETDURATION: Specifies the maximum media-file duration.

EXT-X-VERSION: Indicates the compatibility version of the playlist file. The playlist media and its server must comply with all provisions of the most recent version of the IETF Internet-Draft of the HTTP Live Streaming specification that defines that protocol version.

EXT-X-MEDIA-SEQUENCE: Indicates the sequence number of the first URL that appears in a playlist file. Each media file URL in a playlist has a unique integer sequence number. The sequence number of a URL is higher by 1 than the sequence number of the URL that preceded it. The media sequence numbers have no relation to the names of the files.

EXTINF: A record marker that describes the media file identified by the URL that follows it. Each media file URL must be preceded by an EXTINF tag. This tag contains a duration attribute that's an integer or floating-point number in decimal positional notation that specifies the duration of the media segment in seconds. This value must be less than or equal to the target duration.

Items are not removed from the playlist when using the EVENT tag; rather new segments are appended to the end of the file. New segments are added to the end of the file until the event has concluded, at which time the EXT-X-ENDLIST tag may be appended. Referring to FIG. 6, the same playlist is shown after it's been updated with new media URIs and the event has ended. Event playlists are typically used when you want to allow the user to seek to any point in the event, such as for a concert or sports event.

Referring to FIG. 7, a live playlist (sliding window) is an index file that is updated by removing media URIs from the file as new media files are created and made available. The EXT-X-ENDLIST tag isn't present in the live playlist, indicating that new media files will be added to the index file as they become available.

Exemplary tags used in the live playlist may include one or more of the following.

EXTM3U: Indicates that the playlist is an extended M3U file. This type of file is distinguished from a basic M3U file by changing the tag on the first line to EXTM3U. All HLS playlists must start with this tag.

EXT-X-TARGETDURATION: Specifies the maximum media-file duration.

EXT-X-VERSION: Indicates the compatibility version of the playlist file. The playlist media and its server must comply with all provisions of the most recent version of the IETF Internet-Draft of the HTTP Live Streaming specification that defines that protocol version.

EXT-X-MEDIA-SEQUENCE: Indicates the sequence number of the first URL that appears in a playlist file. Each media file URL in a playlist has a unique integer sequence number. The sequence number of a URL is higher by 1 than the sequence number of the URL that preceded it. The media sequence numbers have no relation to the names of the files.

EXTINF: A record marker that describes the media file identified by the URL that follows it. Each media file URL must be preceded by an EXTINF tag. This tag contains a duration attribute that's an integer or floating-point number in decimal positional notation that specifies the duration of the media segment in seconds. This value must be less than or equal to the target duration. In addition, the live playlist can use an EXT-X-ENDLIST tag to signal the end of the content. Also, the live playlist preferably does not include the EXT-X-PLAYLIST-TYPE type.

Referring to FIG. 8, the same playlist of FIG. 7 is shown after it has been updated with new media URIs.

Referring to FIG. 9, the playlist FIG. 8 continues to be updated as new media URIs are added.

Figure 10:
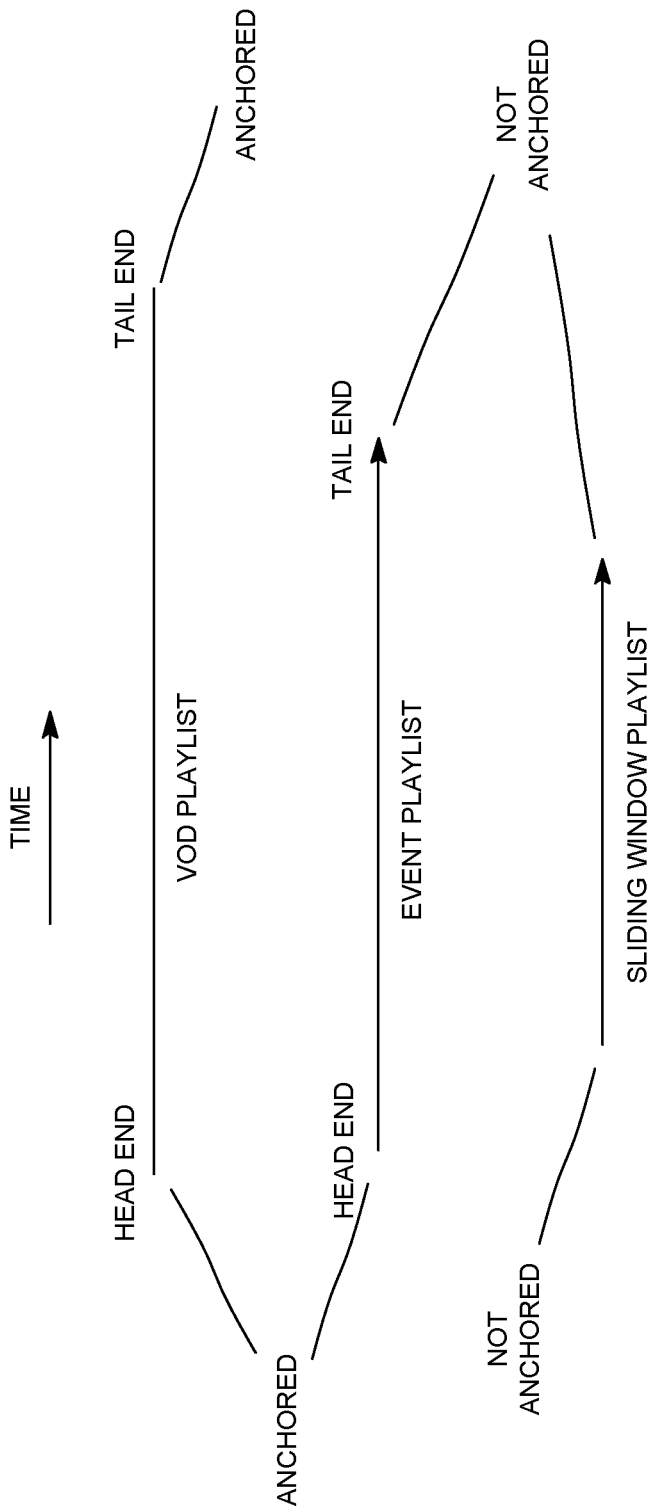
FIG. 10 illustrates anchoring of playlists.

Referring to FIG. 10, in general as it may be observed, the VOD playlist is anchored at both ends (i.e., the head and the tail) and is not updated. As is may be observed, the event playlist is anchored at one end (i.e., the head end) and the other end grows over time (i.e., the tail end). As it may be observed, a sliding window playlist is not anchored at either end.

In the environment of a mobile device, such as a mobile telephone, viewers tend to view the media content on the display of the mobile device. To change what the viewer is watching the viewers tend to interact with the media content by using a finger for navigation. As the finger is dragged to the left on the display a series of thumbnails are typically presented as the playtime is moved back in time. As the finger is dragged to the right on the display a series of thumbnails are typically presented as the playtime is moved forward in time. While this interface paradigm is suitable for the mobile device, a viewer of video content on a display device interconnected to the cable network typically prefers to use fast forward (such as 2×, 4×, 6×), reposition, and fast reverse (such as 2×, 4×, 6×) to seek different portions of the video content. To facilitate such fast forward and fast reverse of content, the same video content may be provided to the customer's player based upon the playlist, and only a portion of it is rendered to provide the desired viewing experience. In some cases, the fast forward and fast reverse may be achieved by using an I-frame (i.e., intra-coded frame) only playlist, which includes an EXT-X-I-FRAMES-ONLY tag.

In general, for a VOD playlist, the viewer may fast forward or fast reverse to any location that is defined within the VOD playlist, which typically includes the entire program. In general, for an event playlist, the viewer may fast reverse and fast forward to any location that is defined within the event playlist, from the head anchor to the current tail of the video content that is included within the latest playlist obtained. In general, for a sliding window playlist, the consumer may fast reverse and fast forward to any location that is defined within the sliding window playlist. The content prior to the sliding window is not generally available based upon the sliding window, nor is content after the sliding window being generally available based upon the sliding window. To obtain an updated list of available content, the corresponding updated playlist is periodically requested from the server, which increases the burden on the resources of the server and associated bandwidth to provide the playlist.

From a viewer's perspective for a cable interconnection, they receive video content in the form of HLS video content from the time that they tune to the channel until a time that they tune to another channel. In this manner, the viewer's perspective is that they should be able to rewind or fast rewind through the content that has been received from the time that they tuned to the channel until the current time. Also, the viewer's perspective is that they should be able to fast forward to what would otherwise be the current content if previously rewound, paused, or fast rewound. This permits the viewer to pause the content and continue watching the content at a later time, while remaining tuned to the same channel. This permits the viewer to rewind the content to view a particular event over again, such as a touchdown play in football, and then to continue viewing the content again in an uninterrupted manner. Preferably, independent of the particular playlist being used, the viewer is restrained to viewing only that portion of the video content that corresponds to the time duration that the viewer started viewing a particular channel to the time the viewer ended viewing the particular channel, together with the ability to fast forward, rewind, fast rewind, etc. over such a time window.

Figure 11:
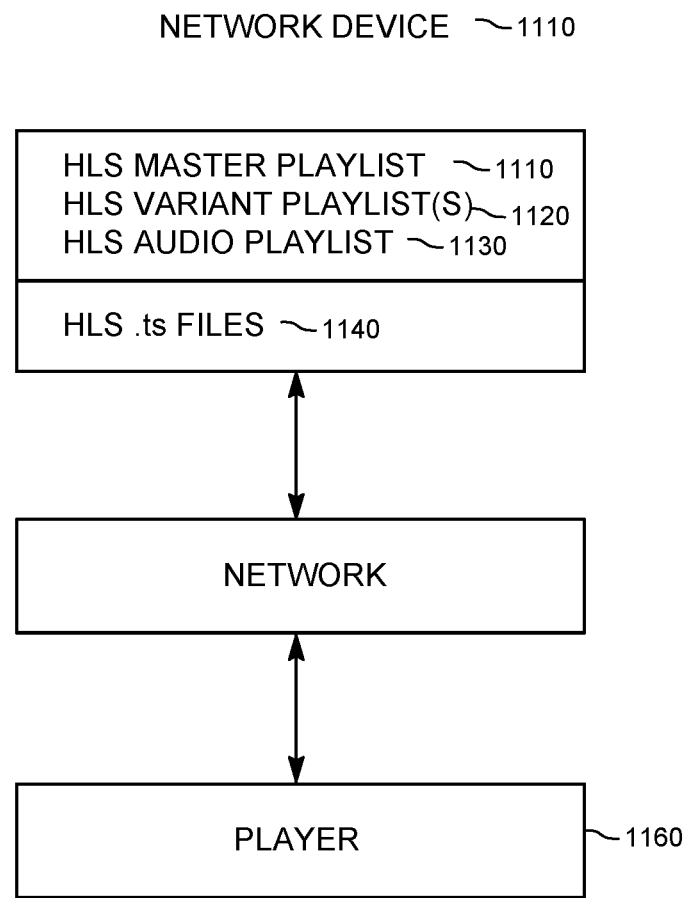
FIG. 11 illustrates a player and a network device.

Referring to FIG. 11, a player 1160 obtains a master playlist (e.g., manifest file) from a network device 1100 (which may include one or more different devices, collectively referred to as a network device) which references each of the variant playlists (e.g., manifest file) for the particular type of playlist (e.g., VOD playlist, event playlist, sliding window playlist) for a particular video content, such as a streaming video channel of a cable system. Based upon the master playlist 1110 the player further obtains each of the variants 1120 for the particular type of playlist, such as the variant playlist for each of the different bitrates that are indicated as available. For example, this may include a low bitrate playlist, a medium bitrate playlist, and a high bitrate playlist that are representative of a video stream of all the frames of the video content, albeit at different bitrates. For example, this may also include particular playlist(s), such as a playlist composed of "I" frames of the video content. Further, in the event that the different playlists are updated as a result of additional content being made available, the player periodically requests an updated playlist for each of the variants. An audio playlist(s) 1130 associated with the audio stream is likewise requested. In this manner, the player 1160 obtains the master playlist 1110 and the variant playlists 1120, which are maintained simultaneously and each selectively updated by the player 1160. The network device 1100, or any other suitable network device, may also include the "chunk" .ts files 1140 for each of the respective playlists.

Referring to FIG. 12, in the case of a VOD playlist, the respective playlists are fixed for the video content, and the player obtains the respective playlists which are simultaneously stored. By way of example, the player may receive the master playlist and three variant playlists, namely, a low bitrate VOD playlist, a medium bitrate VOD playlist, and a high bitrate VOD playlist, together with an audio playlist which are all simultaneously maintained in the player. The player uses the stored playlists to determine which video "chunk" files to request based upon changing bandwidth conditions over time. The player also uses the stored VOD playlists to determine which video "chunk" files to request based upon user selected playback options, such as fast forward, rewind, and fast rewind.

Referring to FIG. 13, in the case of an event playlist, the respective playlists are periodically modified over time for the video content, and the player obtains the respective playlists which are simultaneously stored. By way of example, the player may receive the master playlist and three variant playlists, namely, a low bitrate event playlist, a medium bitrate event playlist, and a high bitrate event playlist, together with an audio playlist which are all simultaneously maintained in the player. The player uses the stored event playlists to determine which video "chunk" files to request based upon changing bandwidth conditions over time. The player also uses the stored playlists to determine which video "chunk" files to request based upon user selected playback options, such as fast forward, rewind, and fast rewind. As time progresses, the player requests updated playlists to supplement and/or replace the existing variant event playlists and audio playlist.

Referring to FIG. 14, in the case of a sliding window playlist, the respective playlists are modified over time for the video content, and the player obtains the respective playlists which are simultaneously stored. By way of example, the player may receive the master playlist and three variant playlists, namely, a low bitrate event playlist, a medium bitrate event playlist, and a high bitrate event playlist, together with an audio playlist which are all simultaneously maintained in the player. The player uses the stored sliding window playlists to determine which video "chunk" files to request based upon changing bandwidth conditions over time. The player also uses the stored playlists to determine which video "chunk" files to request based upon user selected playback options, such as fast forward, rewind, and fast rewind. As time progresses, the player requests updated playlists to supplement and/or replace the existing variant sliding window playlists and audio playlist. In addition, since an updated sliding window playlist removes earlier portions of the playlist when it is updated and adds later portions to the playlist when it is updated, the updated sliding window playlists in the player are updated with the earlier portions of the playlists being retained so that cumulative sliding window playlists are created. In this manner, even when using sliding window playlists, cumulative playlists are created based upon the first playlists received.

Figure 15:
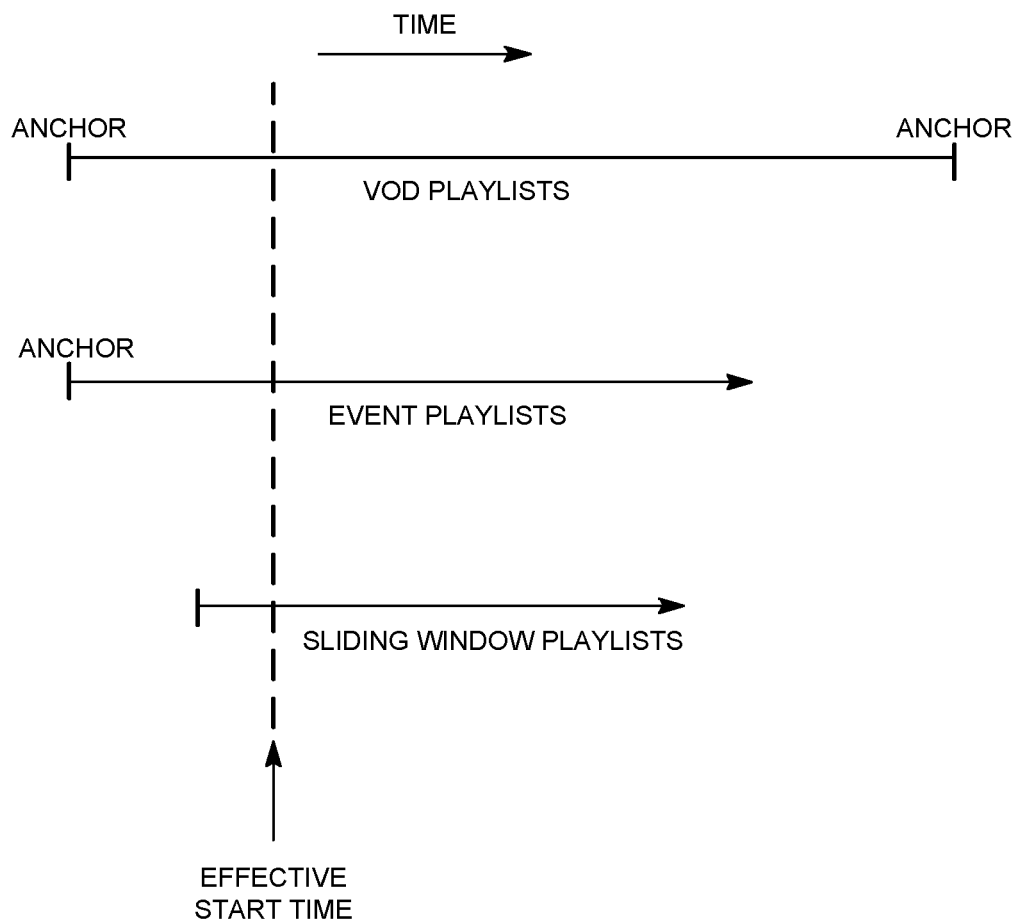
FIG. 15 illustrates effective start time for playlists.

Referring to FIG. 15, independent of whether the user is receiving VOD playlists, event playlists, sliding window playlists, or otherwise, it is desirable for the player to determine an effective start time associated with each of the respective playlists that is coincides with when the user tuned to the particular video content or otherwise the channel. While the respective playlists may extend prior to this effective start time, the player maintains the effective start time until such a time that the user switches to a different channel. For example, the VOD playlists, the effective start time may be at a time later than the anchor time of the VOD playlists. For example, the event playlists, the effective start time may be at a time later than the anchor time of the event playlists. For example, the sliding window playlists, the effective start time may be at a time later than the initially received time of the first sliding window playlists, with additional updated sliding window playlists supplementing the player's sliding window playlists. The effective start time is used as an initial time that the player uses as the earliest time that the user may rewind to or otherwise review previous video content in some manner. It is noted from the perspective of the player, it has no context about when a program starts and ends, and accordingly the effective start time does not necessarily coincide with the start of a program. In other words, the player is only aware that it is receiving playlists and video content after switching to a channel, although not generally aware of the program boundaries.

After the user switches to a different channel, the player may discard the previous master manifest and the variant playlists. Upon switching to a different channel, the player may consider that time as the effective start time for the different channel that is switched to. In this manner, the switching between channels may be considered as a boundary condition between the playlists that are to be retained.

Referring to FIG. 16, the player may support traditional normal rate of playing video content upon switching to a particular video content. The player may also support various trick play modes that are consistent with that historically expected by a viewer based upon a cable network that provides video content using broadcast channels.

For example, the player may include reposition and fast reverse (such as 2×, 4×, 6×) of video content at any desirable location in the playlists to an earlier location up to as early as the effective start time. The player inhibits further reposition and fast reverse (such as 2×, 4×, 6×) to any location earlier than the effective start time, even if the playlists include information regarding video files at locations earlier than the effective start time.

For example, the player permits fast forward (such as 2×, 4×, 6×) to any location that would be consistent with the current play time that the video content is being provided as "live" content from the video content source.

The player may pause the playing of video content and unpause the playing of the video content at a later time. While paused, the player may continue to receive the updated playlists for the content that is available to be viewed by the user after unpausing the playing of the video content.

With the periodic acquisition of all of the desired variant playlists, such as two or more of the variant playlists up to all of the variant playlists, the player will maintain all the necessary information to be able to switch between different bitrate streams that are available for all of the potentially selected content (e.g., from the effective start time to the current play time). Maintaining the necessary information alleviates the need to request variant playlists that would otherwise not be retained in the player, and in many cases attempt to request variant playlists for portions of the video content that are no longer available from a network device. By way of example, while fast reversing the player may select a different set of video files based upon a different playlist than being currently used for normal video play. By way of example, if the bandwidth changes over time and previous content is desired, the player may select lower bit rate video files based upon a different variant playlist to play or otherwise the previous video content. The acquisition of the variant playlists over time enables the player to obtain any of the previously available content from the effective start time in a HLS compliant manner that is independent of any particular HLS implementation.

In some cases, the master manifest may be modified to include one or more of the variant playlists therein. Preferably, the master manifest is provided to the player with the variant playlists included therein. In this manner, the player uses a single master manifest to determine the appropriate video files to accommodate the playing of the video content, inclusive of trick play, from the effective start time to the current play time. The single master manifest may be updated in a manner that maintains any variant playlists that are included therein from the effective start time to the current play time.

Figure 17:
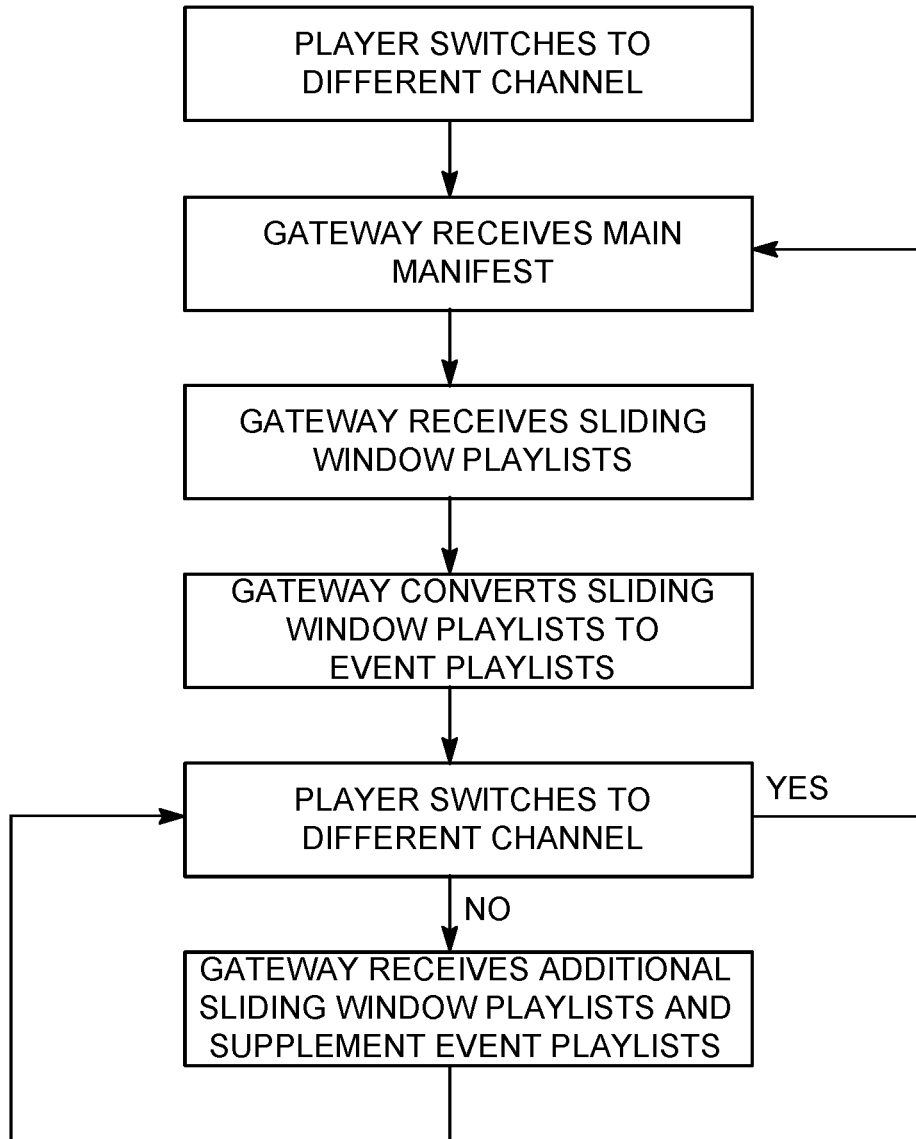
FIG. 17 illustrates a HLS sliding playlist to event playlist conversion system.

Referring to FIG. 17, in some cases, upon the player switching to a different channel the gateway receives a master manifest, and a plurality of or otherwise all of the respective sliding window playlists. Each of the sliding window playlists may be converted into a corresponding event playlist by the gateway. In this manner, an anchor point based upon the switching to the different channel is created, and preferably the anchor point of the event playlists is selected to be the time of the switching to the different channel. If there are previous times before the switching time in the sliding window playlists, they may be discarded or otherwise not used, if desired. If the player switches to a different channel, then the gateway receives a different master manifest, receives different sliding window playlists, and converts the different sliding window playlists to event playlists. As the gateway receives new sliding window playlists, the event playlists are supplemented with the additional information for the additional video content. The resulting event playlists are used to select appropriate video content.

In another embodiment, the player is most often playing the video content at a normal play rate based upon one of the variant playlists. The gateway preferably updates the variant playlist that is currently being used on a relatively frequent basis for identifying the video files that are to be played. In this manner, the gateway would likely make relatively frequent requests for an updated variant playlist for the video files currently being used. In addition, the gateway preferably updates the variant playlists that are not currently being used on a relatively infrequent basis for identifying the video files that may be used in the future as a result of trick play. In this manner, the gateway would likely make relatively infrequent requests for updated variant playlist for the video files not currently being used. This reduces the stress on the network device that is providing the variant playlists and associated bandwidth limitations, especially in the case of thousands or tens of thousands of such gateways making such requests.

In another embodiment, the server could include a predictable file naming structure for the files, such as a sequential numbering low 000001, low 000002, low 00000; medium 000001, medium 000002, medium 000003; high 000001, high 000002, high 000003, etc. In this manner, the player would be able to infer the file names of available files referenced in a variant manifest that has not yet been requested or otherwise obtained. In this manner, the player may reduce the rate at which the variant manifests are requested by relying, at least in part, upon the file naming structure.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A method for rendering a HTTP Live Streaming video stream on a display comprising:
   (a) a player receiving a master manifest from a network device in response to selecting a video channel, that is different than an immediately previously video channel being rendered, at a start time coinciding with said selecting said video channel for said player for rendering said HTTP Live Streaming video stream;
   (b) said player receiving a plurality of variant manifests referenced by said master manifest from said network device, where each of said variant manifests references video files each of which having a different bit rate for the same video stream, where said start time for each of said variant manifests is at a temporally later time for rendering said HTTP Live Streaming video stream than an earliest time included in a respective said variant manifest for rendering said HTTP Live Streaming video stream;
   (c) simultaneously maintaining said plurality variant manifests in said player;
   (d) determining an effective start time of said video stream coinciding with said start time of said video channel;
   (e) said player enabling reverse of said video stream based upon one of said variant manifests to as early as said effective start time and not enabling reverse of said video stream based upon one of said variant manifests to a time earlier than said effective start time, where said one of said variant manifests includes references to video files of said time earlier than said effective start time.

2. The method of claim 1 further comprising said player receiving said video stream over a cable network.

3. The method of claim 1 further comprising said player switching between a first of said variant manifests to a second of said variant manifests based upon a change in bandwidth to said player.

4. The method of claim 1 wherein said master manifest includes an EXTM3U tag.

5. The method of claim 1 wherein each of said variant manifests includes an EXT-X-PLAYLIST-TYPE tag that has a value of EVENT.

6. The method of claim 1 wherein each of said variant manifests includes an EXT-X-PLAYLIST-TYPE tag that has a value of VOD.

7. The method of claim 1 wherein each of said variant manifests is free from including an EXT-X-PLAYLIST-TYPE tag.

8. The method of claim 1 wherein said player enabling another reverse faster than said reverse of said video stream based upon one of said variant manifests to as early as said effective start time.

9. The method of claim 1 further comprising updating each of said variant manifests with additional information obtained from said network device.

10. The method of claim 1 wherein said variant manifests are simultaneously maintained until said player switches to a different said video stream not associated with said variant manifests.

11. The method of claim 1 wherein said player enabling fast forward of said video stream based upon one of said variant manifests to as late as a current play time.

12. The method of claim 11 wherein said current play time matches a live position.

13. The method of claim 1 wherein said master manifest is modified to include said variant manifests.

14. The method of claim 1 wherein each of said variant manifests is free from including an EXT-X-PLAYLIST tag when received and each of which is modified to a modified variant manifest that includes an EXT-X-PLAYLIST-TYPE tag that has a value of EVENT.

15. The method of claim 1 wherein one of said variant playlists is obtained at a greater frequency than another one of said variant playlists.

* * * * *

UNITED STATES PATENT AND TRADEMARK OFFICE
CERTIFICATE OF CORRECTION

| | | |
|---|---|---|
| PATENT NO. | : 11,477,522 B2 | Page 1 of 1 |
| APPLICATION NO. | : 17/119386 | |
| DATED | : October 18, 2022 | |
| INVENTOR(S) | : Kaliraj Kalaichelvan and Bill Franks | |

It is certified that error appears in the above-identified patent and that said Letters Patent is hereby corrected as shown below:

In the Specification

Column 9, Lines 54-56: Replace "low 000001, low 000002, low 00000; medium 000001, medium 000002, medium 000003; high 000001, high 000002, high 000003," with --low_000001, low_000002, low_000003; medium_000001, medium_000002, medium_000003; high_000001, high_000002, high_000003,--

Signed and Sealed this
Twenty-seventh Day of August, 2024

Katherine Kelly Vidal
*Director of the United States Patent and Trademark Office*